United States Patent
Zhang et al.

(10) Patent No.: US 11,809,269 B2
(45) Date of Patent: Nov. 7, 2023

(54) FAULT DIAGNOSIS AND INTELLIGENT WARNING METHOD FOR MONITORING SYSTEM DEVICE

(71) Applicant: CASCO SIGNAL CO., LTD., Shanghai (CN)

(72) Inventors: Jiliang Zhang, Shanghai (CN); Enhua Hu, Shanghai (CN); Pengfei Tu, Shanghai (CN); Cunren Zhu, Shanghai (CN)

(73) Assignee: CASCO SIGNAL CO., LTD., Shanghai (CN)

( * ) Notice: Subject to any disclaimer, the term of this patent is extended or adjusted under 35 U.S.C. 154(b) by 0 days.

(21) Appl. No.: 16/978,388

(22) PCT Filed: Mar. 15, 2019

(86) PCT No.: PCT/CN2019/078248
§ 371 (c)(1),
(2) Date: Sep. 4, 2020

(87) PCT Pub. No.: WO2020/001077
PCT Pub. Date: Jan. 2, 2020

(65) Prior Publication Data
US 2021/0055984 A1 Feb. 25, 2021

(30) Foreign Application Priority Data
Jun. 26, 2018 (CN) .......................... 201810671962.8

(51) Int. Cl.
*G06F 11/30* (2006.01)
*G08B 23/00* (2006.01)
(Continued)

(52) U.S. Cl.
CPC ........ *G06F 11/0793* (2013.01); *G06F 11/079* (2013.01); *G06F 11/0772* (2013.01);
(Continued)

(58) Field of Classification Search
None
See application file for complete search history.

(56) References Cited

U.S. PATENT DOCUMENTS 5,513,312 A * 4/1996 Loebig ................ G06F 11/0748
714/E11.186
7,890,794 B1 * 2/2011 Gasser ................ G06F 11/0727
711/159
(Continued)

FOREIGN PATENT DOCUMENTS

CN 103700031 A 4/2014
CN 103713976 A 4/2014
(Continued)

OTHER PUBLICATIONS

International Search Report (in English and in Chinese) and Written Opinion issued in PCT/CN2019/078248, dated Jun. 20, 2019, total 12 pages provided.

*Primary Examiner* — Muhammad Adnan
(74) *Attorney, Agent, or Firm* — HAMRE, SCHUMANN, MUELLER & LARSON, P.C.

(57) ABSTRACT

The present invention relates to a fault diagnosis and intelligent warning method for monitoring a system device, including the following steps: step 1. establishing independent alarm analysis logic and independent recovery analysis logic based on a fault model of each alarm; step 2. controlling the alarm logic and the recovery logic to be mutually exclusively executed; the step 3. performing delay processing on an alarm event and a recovery event; and step 4. establishing a cascading relationship between alarm events generated after the delay processing: establishing an alarm cascading group based on a relationship between different alarm events, automatically determining, by using generation of an alarm event as a triggering condition, whether alarms in a same cascading group simultaneously exist within a time, and generating association information between alarm events. Compared with the prior art, the present invention has the following advantages: reducing a probability of occurrence of false alarms, reducing a quan- (Continued)

tity of invalid alarms, reducing storage space overheads, reducing system CPU consumption, reducing workloads of maintenance personnel, and the like.

7 Claims, 4 Drawing Sheets

(51) Int. Cl.
  *G06F 11/07* (2006.01)
  *G06F 11/32* (2006.01)
(52) U.S. Cl.
  CPC ........ *G06F 11/3075* (2013.01); *G06F 11/327* (2013.01); *G08B 23/00* (2013.01)

(56) References Cited

U.S. PATENT DOCUMENTS

| | | | | |
|---|---|---|---|---|
| 8,504,214 | B2 * | 8/2013 | Genc | G05B 23/0248 |
| | | | | 700/286 |
| 10,049,509 | B1 * | 8/2018 | Liu | G07C 5/008 |
| 10,332,212 | B2 * | 6/2019 | Jhoney | G06Q 40/08 |
| 10,832,564 | B2 * | 11/2020 | Subramanian | G06V 10/764 |
| 2005/0256601 | A1 * | 11/2005 | Lee | G05B 19/4184 |
| | | | | 700/108 |
| 2005/0268147 | A1 * | 12/2005 | Yamamoto | G06F 11/0727 |
| | | | | 714/E11.089 |
| 2007/0078976 | A1 * | 4/2007 | Taylor | H04L 43/103 |
| | | | | 709/224 |
| 2010/0102982 | A1 * | 4/2010 | Hoveida | G06F 11/3072 |
| | | | | 340/691.3 |
| 2011/0185229 | A1 * | 7/2011 | Lapiotis | G06F 11/0709 |
| | | | | 714/25 |
| 2021/0041862 | A1 * | 2/2021 | Qian | G06N 20/10 |

FOREIGN PATENT DOCUMENTS

| | | |
|---|---|---|
| CN | 104125095 A | 10/2014 |
| CN | 104808645 A | 7/2015 |
| CN | 108170581 A | 6/2018 |
| CN | 109002031 A | 12/2018 |
| EP | 0482522 A1 | 4/1992 |

* cited by examiner

FAULT DIAGNOSIS AND INTELLIGENT WARNING METHOD FOR MONITORING SYSTEM DEVICE

FIELD OF TECHNOLOGY

The present invention relates to the field of fault diagnosis and intelligent warning, and in particular, to a fault diagnosis and intelligent warning method for monitoring a system device.

BACKGROUND

Fault diagnosis and intelligent warning are important functions of monitoring systems. In a current monitoring system, device alarm logic and recovery logic are not clearly differentiated, and fault analysis methods are not unified. Consequently, system fault analysis procedures are chaotically executed, and a probability of occurrence of false alarms is increased. In addition, a traditional system has a single fault analysis function, and simply sets a fault generation and recovery condition, thereby resulting in a large increase in a quantity of repeated alarms in the system, increasing storage space overheads and system CPU consumption, and increasing workloads of maintenance personnel. In addition, the traditional system does not consider a relationship between faulty devices during fault analysis. Consequently, a system fault analysis result has low referability, and system function availability is reduced.

SUMMARY

To overcome the disadvantages in the prior art, an objective of the present invention is to provide a fault diagnosis and intelligent warning method for monitoring a system device, to reduce a probability of occurrence of false alarms, reduce a quantity of invalid alarms, reduce storage space overheads, reduce system CPU consumption, reduce workloads of maintenance personnel, and improve system availability.

The objective of the present invention may be achieved by using the following technical solutions:

A fault diagnosis and intelligent warning method for monitoring a system device is provided, including the following steps:

step 1. establishing independent alarm analysis logic and independent recovery analysis logic based on a fault model of each alarm: based on a device operating characteristic, establishing an alarm fault model, and defining device alarm logic and device alarm recovery logic;

step 2. controlling the alarm logic and the recovery logic to be mutually exclusively executed: based on a current fault analysis result, automatically choosing to execute the alarm logic or the recovery logic;

step 3. performing delay processing on an alarm event and a recovery event: buffering a logically generated alarm event and a logically generated recovery event, and controlling, based on an established delay rule, whether to discard a logically generated event; and step 4. establishing a cascading relationship between alarm events generated after the delay processing: establishing an alarm cascading group based on a relationship between different alarm events, automatically determining, by using generation of an alarm event as a triggering condition, whether alarms in a same cascading group simultaneously exist within a time, and generating association information between alarm events.

Preferably, the rule of automatically choosing to execute the alarm logic or the recovery logic in step 2 is as follows:
(1) no alarm is generated, and only the alarm logic is executed each time analysis is performed;
(2) the alarm logic is met and the alarm event is generated, and a system is switched to execute only the recovery logic each time analysis is performed; and
(3) after the recovery logic is met and the recovery event is generated, the system is switched again to execute only the alarm logic each time analysis is performed.

Preferably, the delay rule in step 3 includes an event delay time, and the alarm event and the recovery event are mutually excluded within the delay time.

Preferably, step 3 specifically includes the following rules:
(1) after an alarm event is generated, the alarm event is thrown into an alarm delay queue; if a recovery event is generated again in an alarm delay process, and the event previously thrown into the alarm delay queue is deleted, this recovery event is also to be deleted, and the alarm is updated to still an un-alarmed state;
(2) if a recovery condition is still not met when an alarm event delay time is met, the system actually generates an alarm and updates the alarm to an alarmed state;
(3) when a recovery event is generated after the system actually generates an alarm, the recovery event is to be thrown into a recovery delay queue; if an alarm event is generated again in a recovery delay process, the event previously thrown into the recovery delay queue is to be deleted, this alarm event is also to be deleted, and the alarm state is updated to still an alarmed state; and
(4) if an alarm event is not generated again when the recovery event delay time is met, the system actually recovers an alarm, and updates the alarm to a recovered state.

Preferably, the relationship between alarm events in step 4 includes a hardware connection relationship between alarm event entities, functions that the entities have in the system, and a time interval between the alarm events.

Preferably, step 4 specifically includes the following steps:

step 4.1. according to a connection relationship between system devices and functional mutual impact between devices, according to a response time of the impact between the devices, establishing a relationship configuration of an alarm event between the devices by groups;

step 4.2. when an independent alarm event is generated, determining, by the system, whether another alarm in a cascading group where the alarm is located occurs within a specified time; and step 4.3. if the another alarm occurs, further sending, by the system, information of a relationship between the alarm and an alarm that has occurred at the same time as the alarm is sent; if the another alarm does not occur, only the alarm is sent.

Preferably, the device operating characteristic in step 1 includes a device mechanical state and an electrical characteristic value.

Preferably, the alarm includes, but is not limited to, a switching value alarm, a multi-state quantity alarm, an analog quantity alarm, and a curve alarm in a monitoring system.

Preferably, a rule of defining the alarm logic and the recovery logic is as follows:
(1) when the device operating characteristic is the device mechanical state, the alarm logic is defined to determine whether a state quantity value of the device mechanical state is an alarm value, and the recovery logic is defined to determine whether the state quantity value is a recovery value;

(2) when the device operating characteristic is the electrical characteristic value, the alarm logic is defined to determine whether an analog quantity or a curve of a value of the device electrical characteristic falls within an abnormal range, and the recovery logic is defined to determine whether an analog quantity or a curve falls within a normal range; and (3) a device fault model relates to comprehensive analysis of a plurality of types of data, the alarm logic is defined to determine whether the plurality of types of data all meet an alarm condition, and the recovery logic is defined to determine whether the plurality of types of data all meet a recovery condition.

Compared with the prior art, the present invention has the following advantages:

1. The present invention provides a device fault diagnosis and intelligent warning method for a railway signal centralized monitoring system, a railway signal integrated operation and maintenance system, and a subway maintenance and support system. Based on the method, a probability of occurrence of false alarms is reduced, a quantity of invalid alarms is reduced, and storage space overheads are reduced, system CPU consumption is reduced, and workloads of maintenance personnel are reduced.

2. Based on the present invention, a fault analysis process is strictly controlled, fault analysis manners are unified, and an association relationship between fault analysis results is established, thereby improving effectiveness and availability of a system fault analysis function.

DESCRIPTION OF THE EMBODIMENTS

The following clearly and completely describes the technical solutions in the embodiments of the present invention. Apparently, the described embodiments is some rather than all of the embodiments of the present invention. Based on the embodiments of the present invention, all the other embodiments obtained by those of ordinary skill in the art without inventive effort shall fall within the protection scope of the present invention.

Figure 1A:
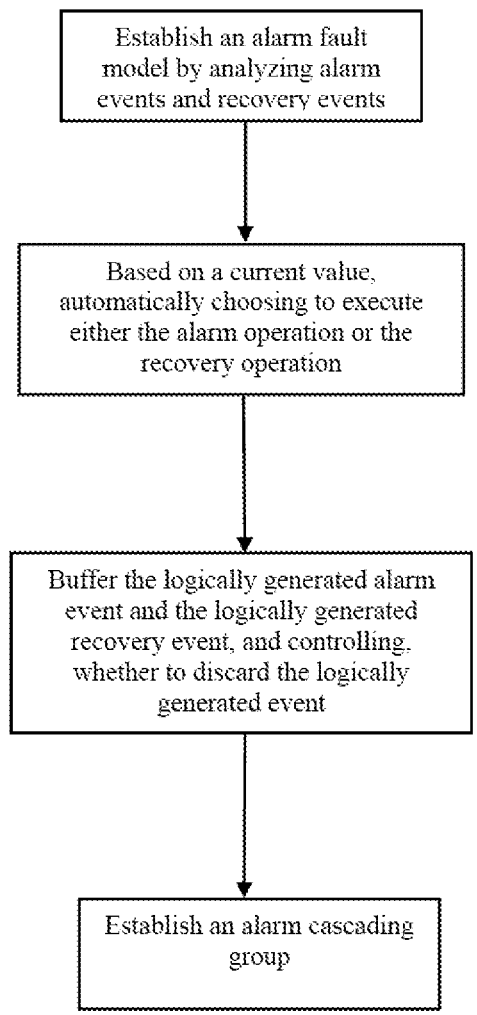
FIG. 1A is a flowchart for operation of a fault diagnosis and intelligent warning method for monitoring a system device.
Figure 1B:
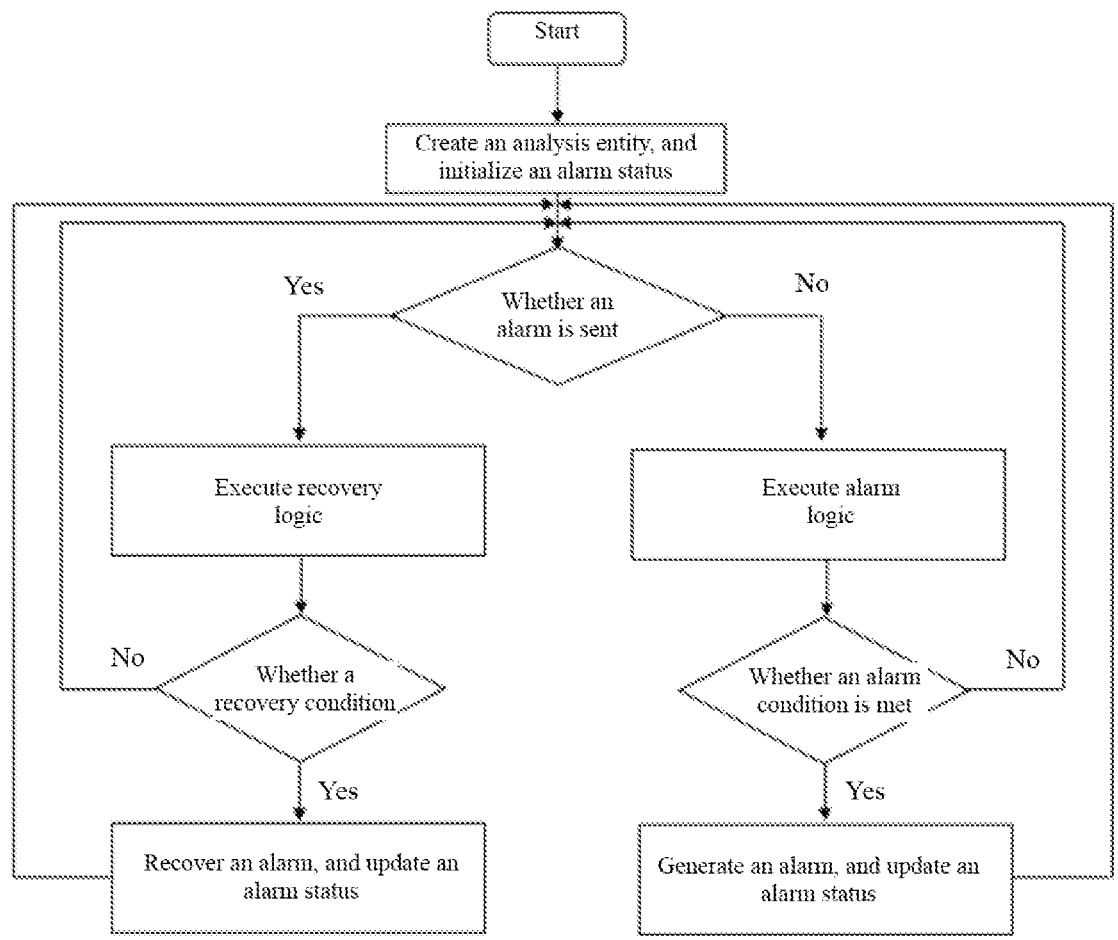
FIG. 1B is a flowchart of controlling execution of alarm logic and recovery logic in a method according to the present invention.

As shown in FIGS. 1A and 1B, a fault diagnosis and intelligent warning method for monitoring a system device is provided, including the following steps Step 1. Establish independent alarm analysis logic and independent recovery analysis logic based on a fault model of each alarm: based on a device operating characteristic, establish an alarm fault model, and define device alarm logic and device alarm recovery logic.

Step 2. Control the alarm logic and the recovery logic to be mutually exclusively executed: based on a current fault analysis result, automatically choose to execute the alarm logic or the recovery logic.

Step 3. Perform delay processing on an alarm event and a recovery event: buffer a logically generated alarm event and a logically generated recovery event, and control, based on an established delay rule, whether to discard a logically generated event.

Step 4. Establish a cascading relationship between alarm events generated after the delay processing: establish an alarm cascading group based on a relationship between different alarm events, automatically determine, by using generation of an alarm event as a triggering condition, whether alarms in a same cascading group simultaneously exist within a time, and generate association information between alarm events.

The rule of automatically choosing to execute the alarm logic or the recovery logic in step 2 is as follows:

(1) no alarm is generated, and only the alarm logic is executed each time analysis is performed;

(2) the alarm logic is met and the alarm event is generated, and a system is switched to execute only the recovery logic each time analysis is performed; and (3) after the recovery logic is met and the recovery event is generated, the system is switched again to execute only the alarm logic each time analysis is performed.

The delay rule in step 3 includes an event delay time, and the alarm event and the recovery event are mutually exclusively executed within the delay time.

Figure 2:
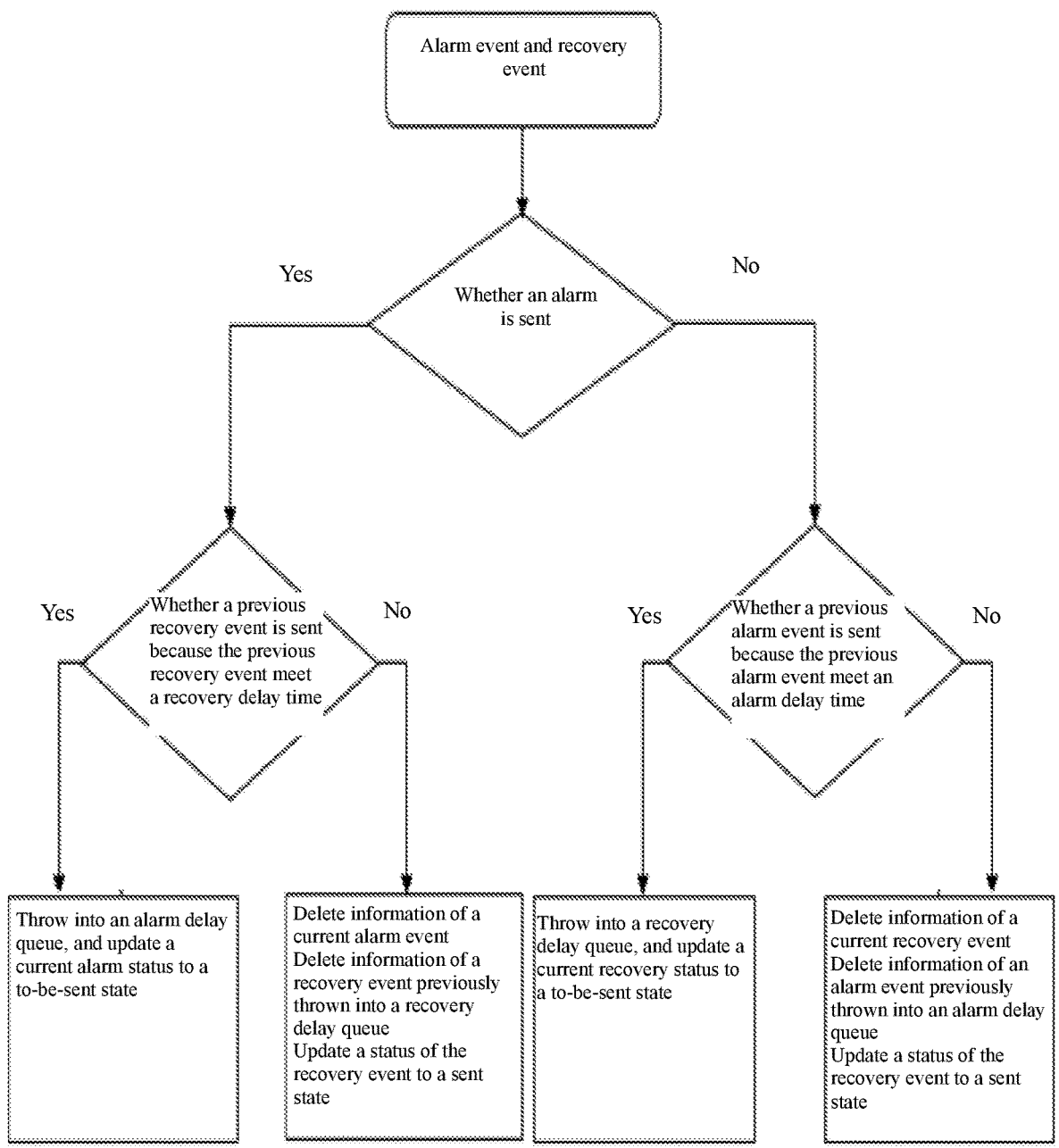
FIG. 2 is a flowchart of performing delay pre-processing on an event generated by alarm logic and an event generated by recovery logic in a method according to the present invention.
Figure 3:
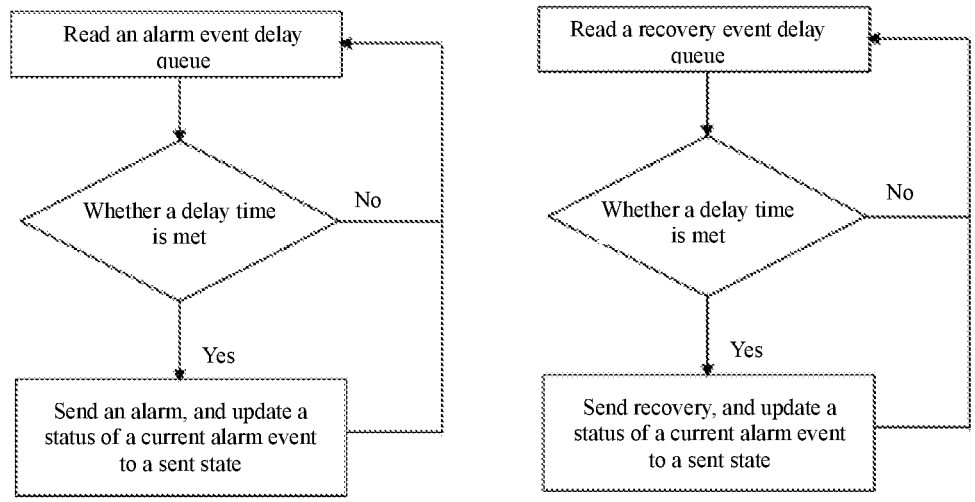
FIG. 3 is a flowchart of performing delay processing on an alarm event and a recovery event in a method according to the present invention.

As shown in FIG. 2 and FIG. 3, step 3 specifically includes the following rules:

(1) after an alarm event is generated, the alarm event is thrown into an alarm delay queue; if a recovery event is generated again in an alarm delay process, and the event previously thrown into the alarm delay queue is deleted, this recovery event is also to be deleted, and the alarm is updated to still an un-alarmed state;

(2) if a recovery condition is still not met when an alarm event delay time is met, the system actually generates an alarm and updates the alarm to an alarmed state;

(3) when a recovery event is generated after the system actually generates an alarm, the recovery event is to be thrown into a recovery delay queue; if an alarm event is generated again in a recovery delay process, the event previously thrown into the recovery delay queue is to be deleted, this alarm event is also to be deleted, and the alarm state is updated to still an alarmed state; and (4) if an alarm event is not generated again when the recovery event delay time is met, the system actually recovers the alarm, and updates the alarm to a recovered state.

The relationship between alarm events in step 4 includes a hardware connection relationship between alarm event entities, functions that the entities have in the system, and a time interval between the alarm events.

Figure 4:
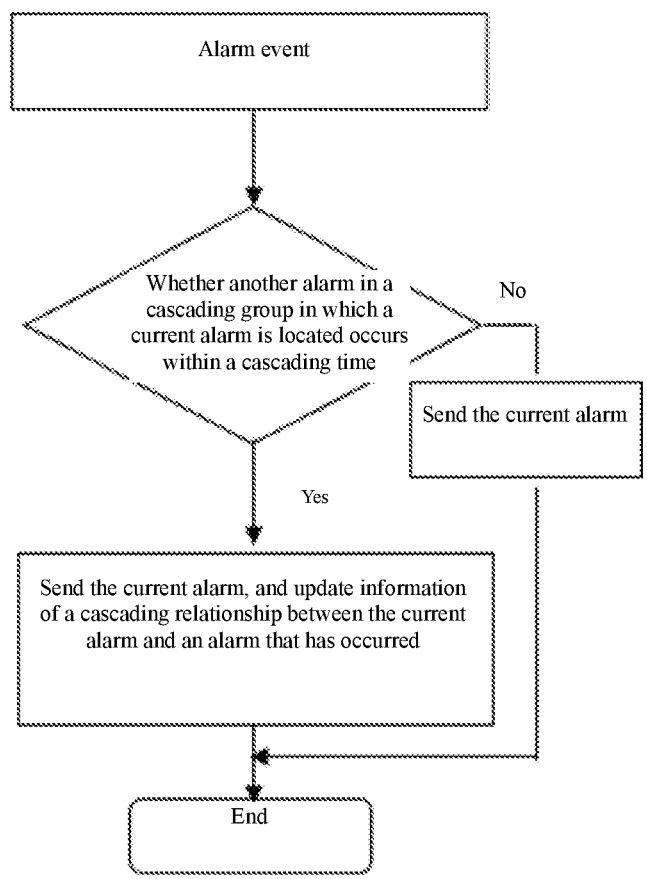
FIG. 4 is a flowchart of establishing a cascading relationship between alarm events generated after delay determining in a method according to the present invention.

As shown in FIG. 4, step 4 specifically includes the following steps:

Step 4.1. According to a connection relationship between system devices and functional mutual impact between devices, according to a response time of the impact between the devices, establish a relationship configuration of an alarm event between the devices by groups.

Step 4.2. When an independent alarm event is generated, the system determines whether another alarm in a cascading group where the alarm is located occurs within a specified time.

Step 4.3. If the another alarm occurs, the system further sends information of a relationship information between the alarm and an alarm that has occurred at the same time as the alarm is sent; if the another alarm does not occur, only the alarm is sent.

The device operating characteristic in step 1 includes a device mechanical state and an electrical characteristic value.

The alarm is not limited to a switching value alarm, a multi-state quantity alarm, an analog quantity alarm, and a curve alarm in a monitoring system.

A rule of defining the alarm logic and the recovery logic is as follows:
(1) when the device operating characteristic is the device mechanical state, the alarm logic is defined to determine whether a state quantity value of the device mechanical state is an alarm value, and the recovery logic is defined to determine whether the state quantity value is a recovery value;
(2) when the device operating characteristic is the electrical characteristic value, the alarm logic is defined to determine whether an analog quantity or a curve of a value of the device electrical characteristic falls within an abnormal range, and the recovery logic is defined to determine whether the analog quantity or the curve falls within a normal range; and
(3) a device fault model relates to comprehensive analysis of a plurality of types of data, the alarm logic is defined to determine whether the plurality of types of data all meet an alarm condition, and the recovery logic is defined to determine whether the plurality of types of data all meet a recovery condition.

What is mentioned above is only the specific implementation of the present invention, but does not limit the protection scope of the present invention, and anyone skilled in the art can easily think of mortifications and alternations within the technical scope disclosed by the present invention, all of which shall fall within the protection scope of the present invention. Therefore, the protection scope of the present invention should be determined by the protection scope of the claims.

What is claimed is:

1. A computer implemented fault diagnosis and intelligent warning method of an alarm fault model for monitoring a railway or subway system, the method comprising:
    monitoring and analyzing a plurality of alarm events and a plurality of recovery events based on operating characteristics of a plurality of devices in operation in the railway or subway system, wherein the plurality of alarm events and the plurality of recovery events are analyzed using a device alarm operation and a device alarm recovery operation;
    based on a current value of at least one of the plurality of devices, automatically choosing to execute either the device alarm operation or the device recovery operation, wherein the execution of the device alarm operation logically generates an alarm event and execution of the device recovery operation logically generates a recovery event;
    buffering the logically generated alarm event and the logically generated recovery event, and controlling, based on a predetermined delay rule, whether to discard the logically generated alarm or recovery event;
    creating an alarm cascading group based on a relationship between different alarm events for the plurality of devices, by automatically determining, by using the logically generated alarm event as a triggering condition, whether any alarms of the plurality of devices in a same alarm cascading group simultaneously exist within a time period, and generating association information between the alarm events for the plurality of devices in the same alarm cascading group; and
    sending off an alarm based on the buffering and the alarm cascading group,
    wherein the device operating characteristic is a device mechanical state value or an electrical characteristic value,
    wherein a rule of defining the device alarm operation and the device recovery operation is as follows:
    (1) when the operating characteristic of a device is the device mechanical state value, the device alarm operation is defined to determine whether the current value is an alarm value, and the device recovery operation is defined to determine whether the current value is a recovery value;
    (2) when the operating characteristic of the device is the electrical characteristic value, the device alarm operation is defined to determine whether an analog quantity or a curve of the value falls within an abnormal range, and the device recovery operation is defined to determine whether the value falls within a normal range,
    wherein the method further comprises analyzing the operating characteristics of the plurality of devices for the mechanical state values and the electrical characteristic values to determine whether the values meet an alarm condition for the alarms in the corresponding alarm cascading group, or the values meet a recovery condition for the alarms in the corresponding alarm cascading group; and
    sending out recovery force when the current value meets any of the alarm conditions in the corresponding alarm cascading group.

2. The method according to claim 1, wherein automatically choosing to execute the device alarm operation or the device recovery operation includes the following:
    (1) if the current value triggers the execution of the device alarm operation, the alarm event is not generated, and only the device alarm operation is executed each time analysis is performed;
    (2) if the current value triggers the execution of the device alarm operation, the alarm event is generated, then the method switches to execute only the device recovery operation each time analysis is performed; or
    (3) after the device recovery operation is met and the recovery event is generated, the method switches to execute only the device alarm operation each time analysis is performed.

3. The method according to claim 1, wherein the predetermined delay rule comprises an event delay time, and the alarm event and the recovery event are mutually excluded within the event delay time.

4. The method according to claim 3, wherein the predetermined delay rule comprises the following rules:
    (1) after the alarm event is generated, the alarm event is placed into an alarm delay queue; wherein if the recovery event is generated during the alarm event, the alarm event previously placed into the alarm delay queue is deleted, and the recovery event is also deleted, and the alarm is updated to be in an un-alarmed state;

(2) if the device recovery operation is not met when the alarm event delay time is met, the alarm fault model generates an alarm by updating the alarm to an alarmed state;

(3) when a recovery event is generated after the alarm is generated, the recovery event is placed into a recovery delay queue; wherein if the alarm event is generated during the recovery event, the recovery event previously placed into the recovery delay queue is deleted, and the alarm event is deleted, wherein the alarm state is updated to be in the alarmed state; and (4) if the alarm event is not generated when the recovery event delay time is met, the method recovers the alarm, and updates the alarm to a recovered state.

5. The method according to claim 1, wherein the relationship between alarm events in the alarm cascading group comprises a hardware connection relationship between alarm event entities, functions that the entities have in the system, and a time interval between the alarm events.

6. The method according to claim 5, wherein the creating of the alarm cascading group comprises the following steps:

creating a relationship configuration of the alarm event between the plurality of devices by groups according to a connection relationship between system devices and functional mutual impact between the plurality of devices and according to a response time of the impact between the plurality of devices in the corresponding groups;

when an independent alarm event is generated, determining whether another alarm in the alarm cascading group where the alarm is located occurs within a specified time; and if the another alarm occurs, sending information of a relationship between the alarm that occurred at the same time as the alarm is sent; and if the another alarm does not occur, only the alarm is sent.

7. The method according to claim 1, wherein the alarm comprises a switching value alarm, a multi-state quantity alarm, an analog quantity alarm, and a curve alarm in a monitoring system.

* * * * *